June 17, 1952            J. G. BUSH            2,600,843
PROCESS FOR MANUFACTURING COMPRESSIBLE GLASS FIBER
SHOCK ABSORPTION MATERIAL AND PRODUCTS
Filed Jan. 24, 1952
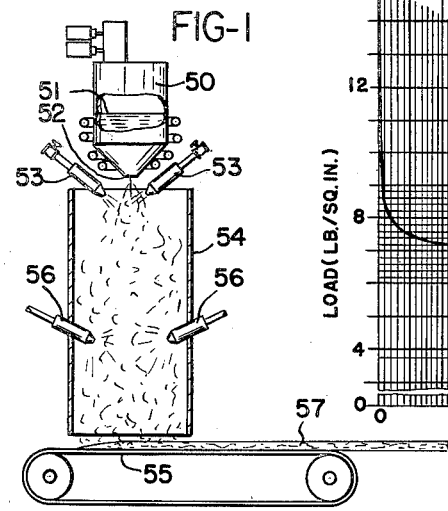
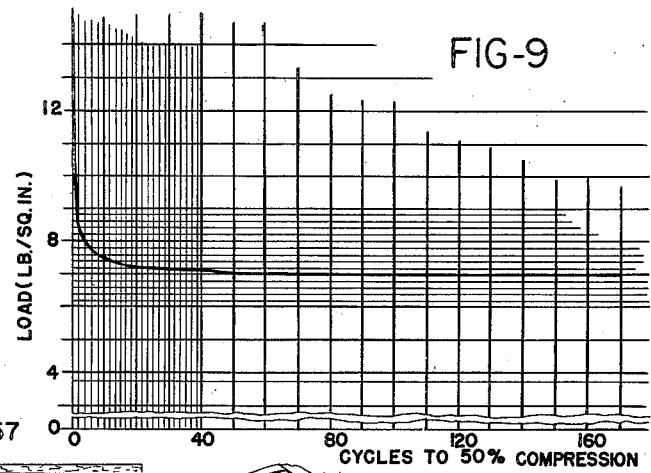
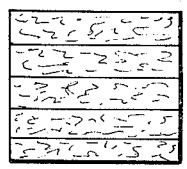
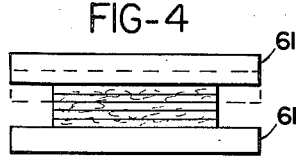
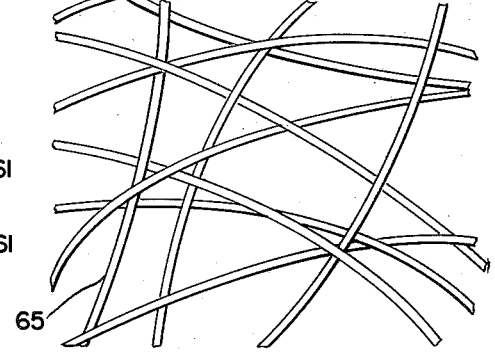
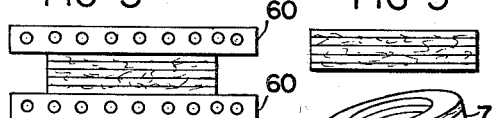
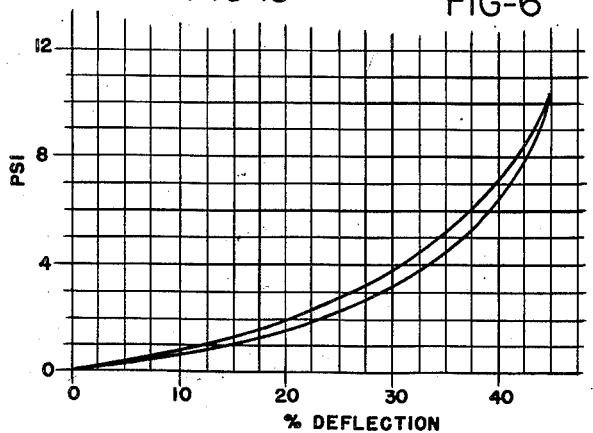
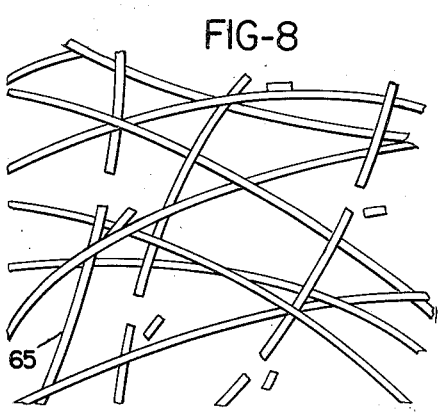
INVENTOR
JOACHIM G. BUSH
BY *Toulmin & Toulmin*
ATTORNEYS Patented June 17, 1952

2,600,843

UNITED STATES PATENT OFFICE 2,600,843

PROCESS FOR MANUFACTURING COMPRESSIBLE GLASS FIBER SHOCK ABSORPTION MATERIAL AND PRODUCTS

Joachim G. Bush, Los Angeles, Calif., assignor to Vibradamp Corporation, Los Angeles, Calif., a corporation of California Application January 24, 1952, Serial No. 268,049

5 Claims. (Cl. 267—1)

This invention relates to a compressible material that retains resilience under the application of pressure of a determined load value for sustaining the load under determined values of resilience and a process of producing such material.

An object of the invention is to utilize a friable material such as glass fibers for supporting pressure loads under conditions of controlled resilience and a process for producing a material capable of such use.

It is another object of the invention to provide a glass fibrous material and the method of producing the same, which material is adapted to resiliently support a pressure load under conditions wherein the degree of compression of the material is related to the load supported by it to give relatively constant conditions of resilient support at predetermined values of compression or deflection of the material.

Still another object of the invention is to provide a glass fibrous material accomplishing the purposes of the foregoing object wherein the load carrying glass fibers are angularly related to the direction of the application of the load on the material with those glass fibers that are incorrectly disposed for cooperative support of the load, or are incapable of cooperative support of the load, are broken or fractured so that interconnecting bridging fibers constitute the load carrying fibers.

It is another object of the invention to provide a process for producing a glass fibrous material for accomplishing the results of the foregoing objects wherein glass fibers are assembled together in a mass sufficient to result in a determined density when the mass is compressed to a predetermined dimension with the assemblage of glass fibers being bonded together while maintained under the controlled degree of compression to establish dimensional stability of the mass of glass fibers, which bonded mass of glass fibers is thereafter compressed or deflected to an extent at least equal to the compression occasioned for support of the maximum load to be imposed on the mass, this cold working of the bonded glass fiber mass resulting in a stabilization of the resilience factors of the material.

The invention further relates to a glass fibrous material for use as a shock absorbing substance and a mount therefor whereby the material is adaptable for use in absorbing vibration and shock acceleration as from a mounting platform for motors, radios and other electronic devices.

In general, the invention comprises a glass fibrous material wherein the glass fibers are individually coated with a suitable binding agent, such as phenol-formaldehyde resin, the mass of binder coated glass fibers being thereafter pressed under heat and pressure to a controlled determined density to form a material which is adapted to be used as a mounting pad to absorb vibration and shock accelerations. Further, the invention includes the processing of the material so obtained by a compression or cold working of the so bonded material to stabilize the resilience factor of the material.

It is also an object of the invention to provide a shock absorbing material which has substantially no drift or fatigue failure, and its vibration absorption character is maintained over a wide temperature and a wide weight range.

The invention further relates to a glass fibrous material usable as a spring with the material of which the glass fiber spring is composed exhibiting stabilized spring rate characteristics, which spring rate characteristics can be controlled and varied according to the spring rate or deflection curve desired for particular operating conditions by alternating the density of the glass fibrous material and/or by a change in the degree of deflection of the glass fibrous material.

It is still another object of the invention to provide a shock absorbing material or a resilient spring material that is composed of glass fibers in which the material is capable of energy dissipation, thereby absorbing shock and dissipating it rather than transmitting shock through the material, and to provide for control of the degree of energy dissipation by varying the density of the material in relation to the load that is to be carried by the material and/or by varying the degree of deflection of the material.

It is another object of the invention to provide a spring made of glass fibrous material with controlled deflection rate and capable of dissipating energy during deflection of the spring.

Other objects and advantages will be apparent from the following description and from the drawings.

In the drawings:

Figure 1 is a diagrammatic cross-sectional view of apparatus for producing fibrous glass with a suitable binder thereon.

Figure 2 is an elevational view of an assemblage of glass fibers of determined weight as ready for subsequent processing.

Figure 3 is a diagrammatic view illustrating the step in the process of producing the fibrous material, of compressing the assemblage of fibers of Figure 2 to a controlled density, and heating the fibers for binding of them together.

Figure 4 represents the step in the process of making the material wherein the bonded assemblage of glass fibers is compressed or deflected to stabilize the resilience value of the material.

Figure 5 is a view of the finished material.

Figure 6 is a perspective view of a spring element made of the material.

Figure 7 is an enlarged cross-sectional view of the glass fibrous material of this invention as produced in the step of the process of Figure 3.

Figure 8 is an enlarged cross-sectional view of the glass fibrous material of Figure 5 as produced in the step of the process illustrated in Figure 4.

Figure 9 is a chart illustrating the stabilization curve of the glass fibrous material.

Figure 10 is a load deflection curve of the stabilized glass fibrous material.

In the construction of the glass fibrous material of this invention, the glass fibers may be produced in one of several well-known devices by which the glass fibers are collected as a felted assemblage in a mat or pad form. These glass fibers may be long relatively continuous length fibers, or can be short length staple fiber, or a mixture of them. In general, the glass fibers are produced by the application of high pressure streams of a gaseous medium applied to opposite sides of thin streams of molten glass whereby the molten glass is drawn and attenuated into fine glass fibers or filaments of extremely fine diameter, depending upon the exact processing of the glass material. Preferably, the glass fibers used in this invention are those having a diameter of between 0.00005 and 0.00025 inch.

The glass fibers or filaments so formed are collected in a mat or pad of any desired thickness, which mats and pads have utility in various ways well-known in the art.

Depending upon the use intended for the glass fibers thus produced, they can have a binding agent applied to the glass fibers during the course of their production, or the binding agent can be eliminated if desired. The glass fibrous material containing the binding agent is subsequently treated to cause the binding agent to bond the glass fibers together.

In this invention the glass fibrous material that is used in the manufacture of the pressure absorption or spring material of the invention is that which contains a binding agent on the glass fibers. The binding agent is preferably phenol-formaldehyde resin, but other binding agents such as nylon, polyethylene, and the various silicon and vinyl compounds and others can be used depending upon the conditions of use of the vibration absorption or spring material, the temperature under which it operates, and other factors. The binding agent shall be one that is applied to the glass fibers in a state in which it can be activated for obtaining its binding action, or shall be one which can be reactivated to secure such result. Thus, either thermosetting or thermoplastic resins can be used, the thermosetting resins being applied on the fibers in an unpolymerized state, whereas the thermoplastic resins can be subsequently reactivated by heat to secure the desired binding action. Preferably resins of the thermosetting type, such as phenol-formaldehyde resin are used.

In producing the glass fibers for use in the production of this invention, apparatus such as that diagrammatically illustrated in Figure 1 can be used. In this apparatus there is a heating and melting chamber 50 that contains a body of molten glass 51 that passes through small openings 52 in the bottom of the chamber 50. At each side of the openings 52 there are provided devices 53 for supplying high-pressure streams of a gaseous medium to opposite sides of the glass streams passing through the openings 52. The streams of gaseous medium draw and attenuate the molten glass streams into fine glass fibers or filaments.

The glass fibers or filaments so produced are collected within a hood 54 and are finally collected on a belt 55. As the glass fibers or filaments fall onto the belt 55, a suitable binding agent is applied to the glass fibers by the spray nozzles 56, thus coating the glass fibers with the desired binding agent.

As the glass fibers or filaments collect upon the belt 55 they felt or intertwine together so that a felted mass or mat 57 of glass fibers is delivered from the hood 54. As the glass fibers or filaments collect on the belt 55 they assume a more or less common direction of arrangement, tending to lay parallel or somewhat angular to one another, but generally in a common direction. However, while the majority of the glass fibers arrange themselves in a common direction, yet numerous fibers are angular to that common direction and some even normal thereto. The effect of these fibers will be discussed hereinafter.

The mat or assemblage of glass fibers produced in the apparatus of Figure 1, and containing preferably a phenol-formaldehyde resin that is unpolymerized or uncured, is cut into desired lengths and the mat is assembled into layers by stacking one section upon another. It will be understood, however, that if desired a mat of desired thickness can be produced rather than producing a thick mat by a laminating process. With the mat 57 being arranged horizontal, it can be generally said that the glass fibers of the mat are positioned horizontally.

The quantity of glass fibers that is brought together into the laminated assemblage of Figure 2 is dependent upon the density of the glass fibrous material that is to be produced. It has been determined that by controlling the density of the glass fibrous material it is capable of resiliently supporting pressures of a very broad range, but that each density of the material will support pressures only within certain ranges resulting in various degrees of compression of the glass fibrous material. For example, a glass fibrous material having a density of 1 pound per cubic foot will support pressures of from 0.1 pound per square inch at 15% deflection to about 1.5 pounds per square inch at 75% deflection. Glass fibrous material having a density of 20 pounds per cubic foot will resiliently support pressures from about 100 pounds per square inch at 15% deflection to about 1600 pounds per square inch at 65% deflection.

Thus, in Figure 2 there is illustrated the step in the process of making the product of this invention of producing an assemblage of glass fibers of sufficient quantity to secure a given density when compressed to a given thickness.

The assemblage of glass fibrous material illustrated in Figure 2 is then placed between pressure plates 60, as illustrated in Figure 3, to compress the assemblage of glass fibers to the desired density, as for example from 1 pound to 20 pounds per square foot. Also, the determined density of the glass fibrous material is established when the material is at a desired thickness or height, dependent upon the dimensions desired in the finished product.

While the glass fibrous material is held to a desired density at a desired dimension between the pressure plates 60, the binding agent on the glass fibers is activated or reactivated to cause a bonding between the glass fibers at their various points of contact. Thus, when the pressure is released from the so-treated glass fibrous material it will retain the dimension at which it was compressed.

The so bonded glass fibrous material is then placed between pressure plates 61 which stress load the bonded glass fibrous material to compress it to an extent not less than that at which it will be compressed when supporting the maximum load to be imposed on the material. A number of such cold working compressions or deflections are given to the material to stabilize the resilience factor of the material. This loading or stressing of the bonded glass fibrous material is occasioned in the same direction as that which will be occasioned upon the material when the supported load is applied.

The effect of the stress loading or cold working of the glass fibrous material is to eliminate the effect of any glass fibers in the material that tend to resist deflection of the material and to fracture those glass fibers that are improperly disposed in the material for cooperative resilient support of the load that is to be imposed on the material.

For example, Figure 7 illustrates the bonded glass fibrous material taken from the step of the process illustrated in Figure 3, while Figure 8 illustrates the same glass fibrous material after stress loading or cold working according to the process step of Figure 4. In Figure 7 all of the various glass fibers are bonded together at their points of contact, and the majority of the fibers lay in a common direction or slightly angular thereto. However, numerous glass fibers are quite angular to the direction of lay of the majority of the fibers and some are even normal thereto. By stress loading the bonded glass fibrous material, those glass fibers that are normal to the lay of the majority of the glass fibers or those extremely angular thereto, are fractured or broken, as illustrated by the glass fibers numbered 65 in Figure 8. The fracturing or breaking of these glass fibers permits the remaining fibers that cooperate to support the load to remain wholly effective at all times, and with those glass fibers that would resist the resilient action of the glass fibrous material fractured or broken, the resilience factor of the material is stabilized.

For example, in Figure 9 there is illustrated a chart showing the result of cold working or compression cycling of the bonded glass fibrous material. The material tested consisted of bonded glass fibrous material of a density of 6 pounds per cubic foot which was compressed to 50% of its initial height and is to carry full load at 40% deflection. Normally cycling or cold working is carried 10% beyond the maximum deflection of the material under maximum load to stabilize the resilience value of the material under full load conditions.

As represented in the chart, it will be seen that the initial compression of the material to 50% of its initial height required a load of about 16 pounds per square inch. After the first two compression cycles the load required to compress the material to 50% of its height reduced to about 8 pounds per square inch. It will thus be seen that the maximum degree of stabilization of the resilience factor is obtained in the initial loadings or compression stressings of the material.

Thereafter, up to the first ten cycles of stress loadings the pressure required for loading changes only a minor amount, the pressure loading being reduced from about 8 pounds per square inch to slightly over 7 pounds per square inch. At this point the glass fibrous material is sufficiently stabilized that it can be said to be stabilized for all practical purposes. However, in the event for the need of extreme accuracy for the stabilization of the resilience factor, the material can be cycled an additional number of times until at about fifty cycles of stress loadings the product becomes fully stabilized for all practical purposes, even of extreme accuracies.

The stabilized product is now capable of producing repeat performance of spring loading with both a compression and extension of the material following substantially the same rate curve as shown by the typical load deflection curve of Figure 10. The amplitude of vibration absorption is regulated by the hysteresis loop shown on the load deflection curve. By varying the density of the material for a given load to be supported, and thereby varying the degree of compression or deflection of the material, various load deflection curves may be obtained with varying curve shapes on the hysteresis loop to secure the desired control over the amount of energy absorbed by the material in its deflection.

The load deflection curve of Figure 10 is that of a stabilized material of 6 pounds per cubic foot density under a maximum of 45% deflection stabilized by cold working or stress loading ten times. The original free height of the material being 0.999 inches, with the new free height after stress loading and stabilization being 0.994 inches.

The assemblage of the glass fibers coated with phenol-formaldehyde resin is a combination of 5% to 25% phenol-formaldehyde and 95% to 75% glass fibers, with the preferred product containing 15% phenol-formaldehyde and 85% glass fibers. The phenol-formaldehyde used as a binder is preferably of from 97% to 40% by weight of phenol, and 3% to 60% by weight of formaldehyde.

In curing the phenol-formaldehyde resin in the step illustrated in Figure 3, the press plates 60 are heated to a preferred temperature of about 300° F., but which can be varied from about 250° F. to 450° F. In the curing or polymerization of the phenol-formaldehyde resin there is a loss of about 8% by weight of the phenol product.

The glass fibrous material of this invention can be pressure loaded until the load plus the amplitude of vibration compresses the material within 400% of its block compression point. A normal safety factor of 500% is incorporated in the design of the product; the material, if designed to carry 5 pounds, will safely carry 25 pounds.

In Figure 6 there is illustrated a spring element made from the glass fiber shock absorbing material of this invention. The spring element 75 is cylindrical in shape and is adapted to be compressed or deflected along the axis of the element. The staple glass fiber of which the spring element 75 is composed, or mixture of staple glass fiber and continuous length glass fiber, are disposed generally horizontally, that is in an arrangement normal to the axis of the element. Thus, the glass fibers in the shock absorbing material forming the spring element act as a multiplicity of cantilever springs to secure a positive and determined resilient factor in the spring element after it has been stabilized in the manner heretofore described.

The spring element 75 will exhibit characteristics of a spring and in addition provides for absorption or dissipation of energy as a result of the hysteresis loop developed in the material as illustrated in Figure 10. It is considered that there are a certain percentage of unbonded glass fibers in the spring element that frictionally resist spring movement and thereby provide for the energy dissipation within the material of which the element is made.

While there is disclosed and described herein the preferred embodiment of the invention concerning the glass fibrous material and the process of making it, it is understood that alterations can be made in the material and in the process without departing from the spirit of the invention, and that those modifications that fall within the scope of the appended claims are intended to be included herein.

I claim:

1. In a method of manufacturing a glass fiber spring: the steps of providing a plurality of relatively thin layers of glass fiber each fiber of which is coated with a heat-curable resin; assembling said layers in position one over the other to form a relatively thicker body than the independent layers and in which the major portion of the fibers are substantially parallel to the same plane, a portion of each layer of fibers having fibers arranged substantially vertically to the direction of the main body of fibers of each layer; compressing the assembled layers into a mass of predetermined density; heating the compressed mass while retained at the predetermined density to cure the resin and to cause bonding between the glass fibers at their various points of contact, and stabilizing the mass by the application of a uniform compressive force over the entire mass and at a predetermined and uniform load which is higher than the maximum load to be imposed on the glass fiber spring until the vertical and substantially vertical fibers are broken and at least a portion of said bonds between the glass fibers are broken.

2. In a method of manufacturing a glass fiber spring: the steps of providing a plurality of relatively thin layers of glass fiber each fiber of which is coated with a heat-curable resin; assembling said layers in position one over the other to form a relatively thicker body than the independent layers and in which the major portion of the fibers are substantially parallel to the same plane, a portion of each layer of fibers having fibers arranged substantially vertically to the direction of the main body of fibers of each layer; compressing the assembled layers into a mass of predetermined density; heating the compressed mass while retained at the predetermined density to cure the resin and to cause bonding between the glass fibers at their various points of contact, and stabilizing the mass by the application of a uniform compressive force repeatedly over the entire mass and at a predetermined and uniform load which is higher than the maximum load to be imposed on the glass fiber spring until the vertical and substantially vertical fibers are broken and at least a portion of said bonds between the glass fibers are broken.

3. In a method of manufacturing a glass fiber spring: the steps of providing a glass fibrous material wherein each of said fibers are coated with a heat-curable resin; said fibers forming a relatively thick body and in which the major portion of the fibers are substantially parallel to the same plane and are load-carrying, a portion of said fibers being arranged substantially vertically to the direction of the main body of fibers and being incapable of carrying the load; compressing the assembled layers into a mass of predetermined density; heating the compressed mass while retained at the predetermined density to cure the resin and to cause bonding between the glass fibers at their various points of contact, and stabilizing the mass by cold working the mass by the application of a uniform compressive force over the entire mass to compress the mass to an extent at least equal to that caused by subjection of the mass to the maximum load to which said mass is to be subjected until the vertical and substantially vertical fibers are broken and at least a portion of said bonds between the glass fibers are broken.

4. A new article of manufacture for use as a spring: comprising the combination of a plurality of superimposed glass fibers forming a mass of a predetermined density, each fiber having a coating thereon of heat-curable resin, the major portion of said fibers being substantially parallel to the same plane, a portion of the glass fibers being unbonded with the remainder bonded together at their points of contact, a minor portion of said fibers being substantially vertical to the direction of the main body of fibers, said fiber mass having substantially all of said minor portion of fibers broken whereby the compressive deflection of said fiber mass is predetermined and uniform for a predetermined load.

5. A new article of manufacture for use as a spring: comprising the combination of a plurality of glass fibers the major portion of which fibers are parallel to the same plane, a minor portion of said fibers being substantially normal to the direction of said major portion of fibers, each of said fibers having a coating thereon of heat-curable resin, said fiber mass comprising an open fibrous mass of a predetermined density and in which a portion of the glass fibers are unbonded with the remainder bonded together at their points of contact, and wherein substantially all of said minor portion of fibers are broken whereby the compressive deflection of said glass fiber mass is predetermined and uniform for a predetermined load.

JOACHIM G. BUSH.

REFERENCES CITED

The following references are of record in the file of this patent:

UNITED STATES PATENTS

| Number | Name | Date |
|---|---|---|
| 2,331,146 | Slayter | Oct. 5, 1943 |
| 2,500,665 | Courtright | Mar. 14, 1950 |
| 2,527,628 | Francis | Oct. 31, 1950 |